US009705838B2

(12) United States Patent
Shuster et al.

(10) Patent No.: US 9,705,838 B2
(45) Date of Patent: *Jul. 11, 2017

(54) MOBILE STATUS UPDATE DISPLAY

(71) Applicants: Gary Stephen Shuster, Fresno, CA (US); Brian Mark Shuster, Vancouver (CA)

(72) Inventors: Gary Stephen Shuster, Fresno, CA (US); Brian Mark Shuster, Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/791,169

(22) Filed: Jul. 2, 2015

(65) Prior Publication Data
US 2015/0312203 A1 Oct. 29, 2015

Related U.S. Application Data

(63) Continuation of application No. 14/513,200, filed on Oct. 13, 2014, now Pat. No. 9,077,679, which is a
(Continued)

(51) Int. Cl.
H04H 20/71 (2008.01)
H04L 12/58 (2006.01)
H04W 4/20 (2009.01)
G06F 3/0485 (2013.01)
G06F 3/0488 (2013.01)
(Continued)

(52) U.S. Cl.
CPC ............ *H04L 51/32* (2013.01); *G06F 3/0485* (2013.01); *G06F 3/0488* (2013.01); *G06Q 20/145* (2013.01); *H04L 12/1813* (2013.01); *H04L 51/12* (2013.01); *H04L 67/10* (2013.01);
(Continued)

(58) Field of Classification Search
CPC ...................................... H04W 4/06

USPC ......... 370/252–312, 328–339; 345/632, 736; 375/632, 736
See application file for complete search history.

(56) References Cited

U.S. PATENT DOCUMENTS

| 2007/0025303 A1* | 2/2007 | Koomen ............ G06Q 20/20 370/338 |
| 2010/0144430 A1* | 6/2010 | Graham ............ A63F 13/12 463/29 |
| 2010/0211868 A1* | 8/2010 | Karmarkar ........ H04M 1/72547 715/234 |

OTHER PUBLICATIONS

Evaluating a Wearable Display Jersey for Augmenting Team Sports Awareness, Mitchell Page and Andrew Vande Moere, Key Center of Design Computing & Cognition University of Sydney, NSW year 2006, Australia.*

* cited by examiner

Primary Examiner — Iqbal Zaidi
(74) Attorney, Agent, or Firm — Sherrie Flynn; Coleman & Horowitt, LLP

(57) ABSTRACT

A method for using a wireless receiver may include receiving subscribed messages for a user identified with a user account of a hub, being messages posted by other uses of the hub to which the user has subscribed. The method may include automatically processing the messages to determine content for display on a display device, and displaying the content on the display device. The display device may be configured as two separate screens mounted at separate locations on the user's body. The messages may include user status messages, which are messages posted to the hub by the user, and the user status messages and subscription messages may be displayed on separate ones of the two screens. An apparatus for performing the method may include a processor coupled to a memory holding encoded instructions for performing operations of the method.

20 Claims, 2 Drawing Sheets

Related U.S. Application Data continuation of application No. 13/306,850, filed on Nov. 29, 2011, now Pat. No. 8,861,421.

(60) Provisional application No. 61/417,739, filed on Nov. 29, 2010.

(51) Int. Cl.
  *G06Q 20/14* (2012.01)
  *H04L 12/18* (2006.01)
  *H04L 29/08* (2006.01)
  *H04W 4/12* (2009.01)

(52) U.S. Cl.
  CPC ............ H04L 67/26 (2013.01); H04W 4/206 (2013.01); H04W 4/12 (2013.01)

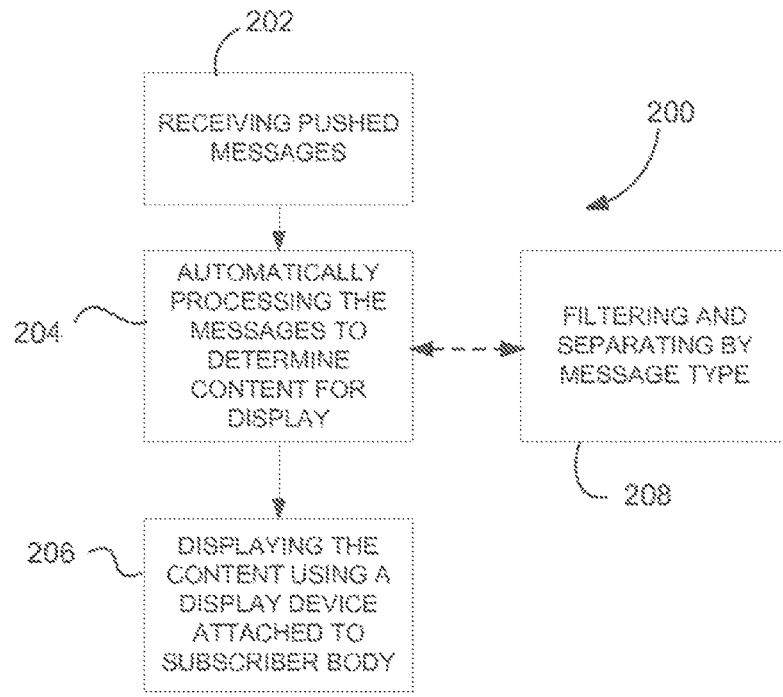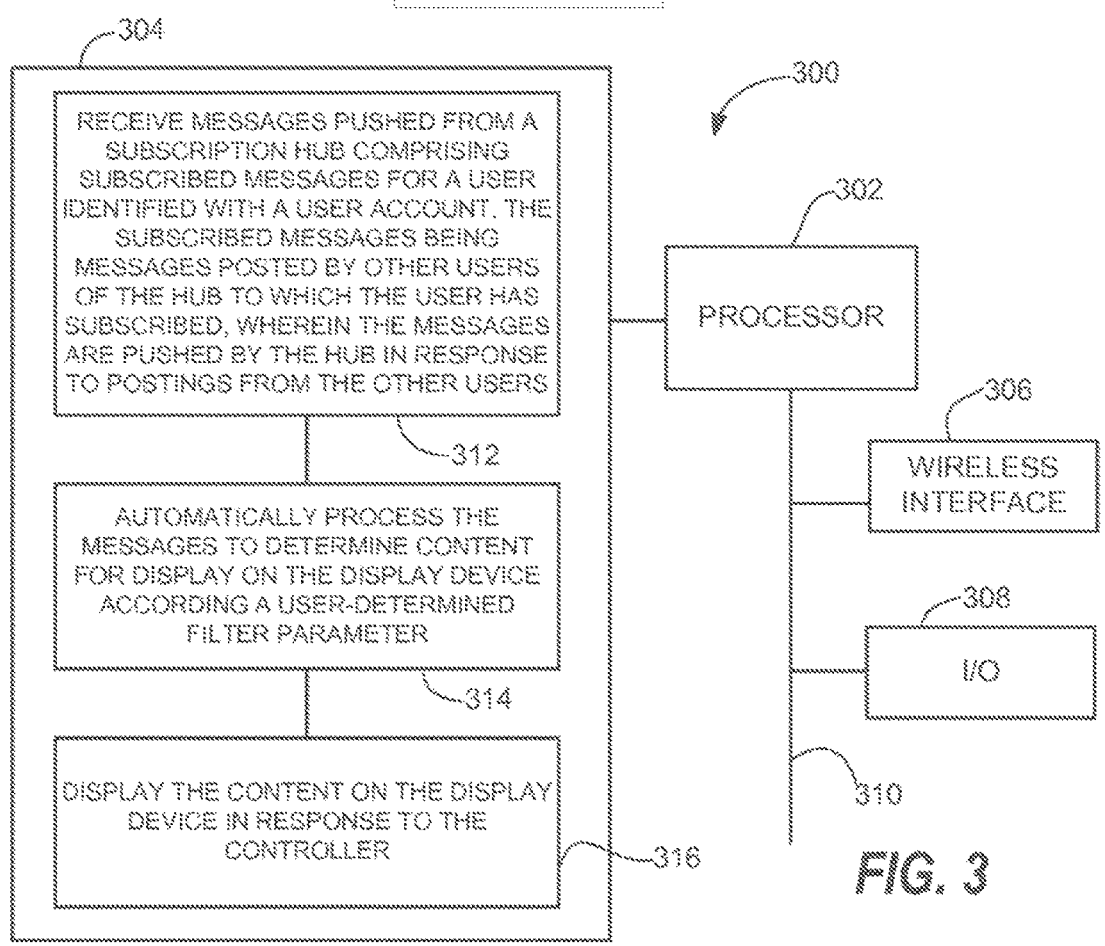

MOBILE STATUS UPDATE DISPLAY

CROSS-REFERENCE TO RELATED APPLICATIONS

This application claims priority to and is a continuation of U.S. patent application Ser. No. 14/513,200, filed Oct. 13, 2014, which is a continuation of U.S. patent application Ser. No. 13/306,850, filed on Nov. 29, 2011 (now U.S. Pat. No. 8,861,421, issued Oct. 14, 2014), which claims priority to U.S. Provisional Patent Application Ser. No. 61/417,739, filed Nov. 29, 2010, all of which are incorporated by reference herein in their entirety.

FIELD OF INVENTION

This application relates to methods and systems for using wireless electronic communications systems for mobile status update display and related applications for multicast interpersonal communication.

DISCUSSION OF THE BACKGROUND

Before the development of radio and television, very few people could engage in multicast messaging. Similarly, before the development of telephones, peer-to-peer communications were limited to in-person discussions. With the development of electronic mail, message boards and similar electronic communications tools, complex peer-to-peer and multicast messages may become possible almost without regard to financial means or popularity. The development of social networking further democratizes complex multicast communication, and also generates a hybridized communication: peer-to-peer communication within multicast group, which may include almost any number of members greater than one. The social networking communication mechanism may occupy a common area between gossip, multicast, voyeurism, business networking, social networking, family communications, peer-to-peer communication, reunion services, social and political activism, and commercial endeavors.

With the growing popularity of multicast speakers (such as those with Twitter™ followers and Facebook™ people and pages), the amount of communication ultimately directed to each listener may increase greatly. Twitter™, Google+™ and Facebook™ are examples of social networking and/or microblogging services offered through particular branded websites. The Twitter™ service enables its users to send short messages and read other users' short messages, called tweets. Tweets are text-based posts of up to 140 characters displayed on the user's profile page. Tweets are publicly visible by default on the user's "status" page; however senders can restrict message delivery to an approved group. Users may subscribe to other users' tweets, in which case the system automatically displays the other tweets on the user's Twitter™ page. The combination of the user's tweets and the tweets of all other uses that the user follows combine to create the user's Twitter™ feed. A dedicated Twitter™ user, for example, might follow updates—subscribe to receive tweets—from any practicable number of people. A similar process may occur with social networking sites such as Facebook™, where a user can receive a message alerting the user whenever information is posted to the user's page or a friend's page. Many sites, including Facebook™ and Google+™, aggregate third party posts in a manner similar to the Twitter™ feed.

Although there is substantial complexity to human affairs, the exponentially increasing number of speakers each person listens to has resulted in a need to limit the volume of data accompanying each message. The natural limitations to text messaging (even as further limited by the Twitter™ service to 140 characters) may have started as a technical limitation of the service, but has become a near-necessity to those attempting to "drink from the fire hose" of data.

As people have become accustomed to feeding current status information about themselves, sometimes referred to in brief as their "status," to their friends and followers, so too have they accepted limiting the amount of data required to convey their status. The natural forms of communication that predated electromagnetic and digital communication, such as talking, wearing pins or shirts bearing messages, and speeches may have parented modern communication, but are now often ignored as ways to convey portions of the data stream that constitute modern communication. As odd as it may seem to those raised before the advent of internet-driven social networking, it is not unusual for friends present in the same location to check their Twitter™ or Facebook™ data to monitor the current "status" of other, absent friends—or even of friends currently sitting at the same table. In short, while modern mini-messaging is commonly used to digitally convey real world events, the converse is not true: Digital status does not feed into the real-world communication modes that predated digital communication. Put another way, people may choose to expose all of their Facebook or Twitter updates to the general public, but those same updates are unavailable to other people in the same room unless the other people choose to access a networked device such as a laptop and ask for that data.

Another shortcoming of connecting social networking to the physical world is that social networking programs do not prioritize data based on real world conditions. For example, a user who lives in San Francisco but is visiting Los Angeles may be more interested in updates from friends and entities in Los Angeles than he normally would be while at home. While friends, physical media such as newspapers, and other real world elements incorporate real-time environmental conditions in their determination of what data to present and how to present it, social networking, micro-blogging and services such as Twitter do not.

SUMMARY OF THE INVENTION

The technology may be used to bring elements of modern communication, such as, for example, short, effective status updates into the non-digital world. In so doing, the technology may satisfy a strong need to integrate what have become two parallel but disconnected communication modes—electronic and natural. In an aspect, a method for mobile status update display may include, using a wireless receiver, receiving messages pushed from a subscription hub comprising subscribed messages for a user identified with a user account, the subscribed messages being messages posted by other users of the hub to which the user has subscribed, wherein the messages are pushed by the hub in response to postings from the other users. The method may further include using a processor coupled to the receiver, automatically processing the messages to determine content for display on a display device. The method may further include displaying the content on the display device in response to the processor, wherein the display device is mounted to the user's body using an article of clothing or the like, so that the content is displayed to persons in the vicinity of the user at least partly in response to posting of the messages to the hub.

In an aspect, automatically processing the messages to determine content for display may further include filtering the messages by message type. In a related aspect, the method may include filtering the messages according to relevance to a current location of the display device.

In another aspect, the method for mobile status update display may further include processing the messages, wherein the messages further include user status messages which are messages posted to the hub by the user, and wherein the messages are pushed by the hub to the receiver further in response to postings from the user. In a related aspect, the method may include displaying the content, wherein the display device includes two separate screens mounted at separate locations of the user's body. Accordingly, the method may further include processing the subscribed messages for display exclusively on a first one of the two separate screens, and the user status messages for display exclusively on a second one of the two separate screens. In related aspects, an apparatus for implementing the method for mobile status update display may be provided for performing any of the methods and aspects of the methods summarized above or described in more detail below. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a wireless interface for to a communications network and a processor for processing information from a server using an algorithm as described herein. Similarly, an article of manufacture may be provided, including a non-transitory computer-readable storage medium holding encoded instructions, which when executed by a processor, may cause a computer configured as a mobile display apparatus to perform the methods and aspects of the methods as summarized above and described in more detail herein.

More detailed aspects of the foregoing method and apparatus, and related methods and apparatus, are described in more detail in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

FIG. 2 is a flow chart showing an example of a method for mobile status update display.

FIG. 3 is a block diagram showing an example of a apparatus for performing a method as shown in FIG. 2

DETAILED DESCRIPTION

Figure 1:
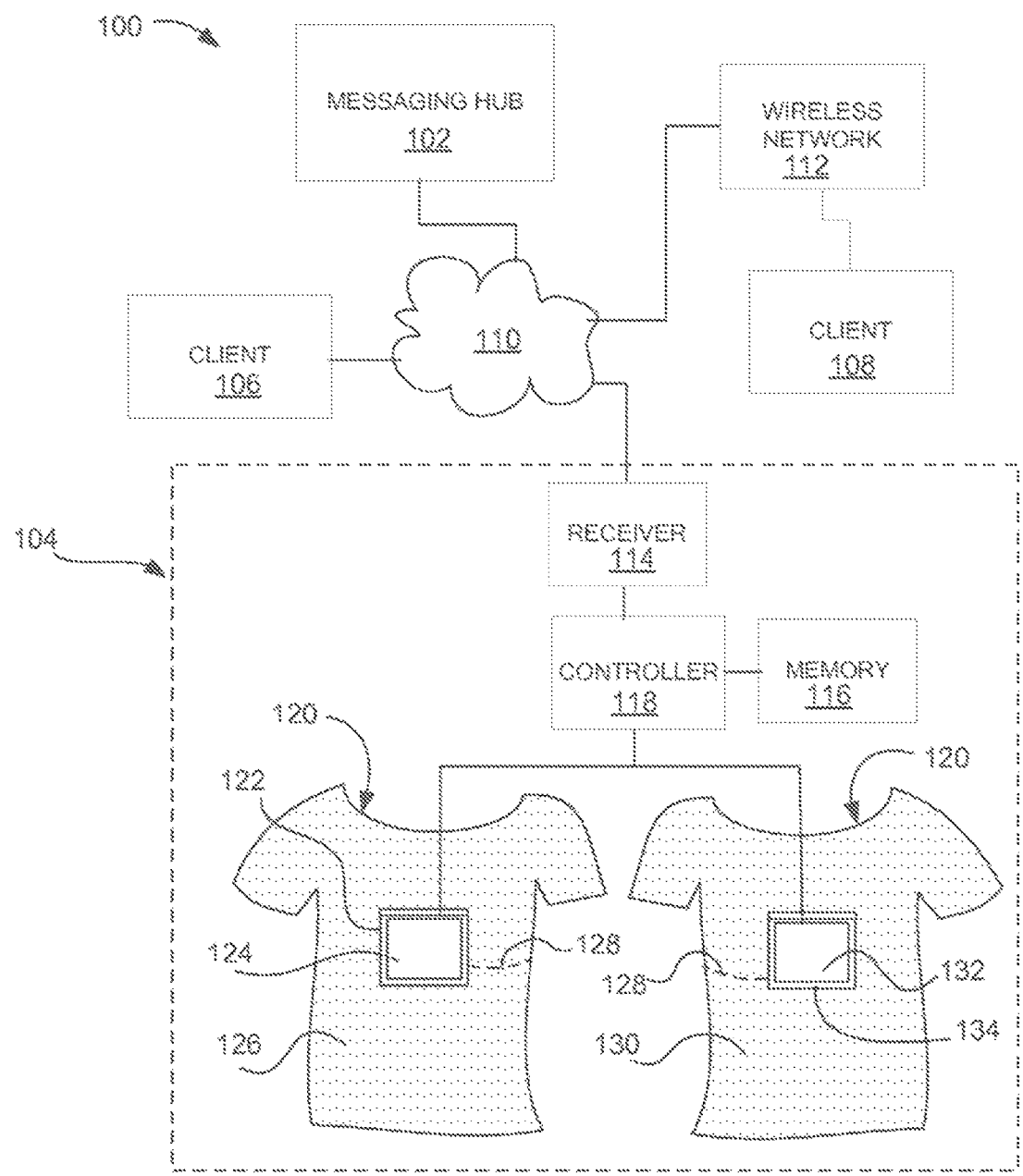
FIG. 1 is a block diagram showing an example of a system for performing one or more methods as described herein related to mobile status update display.

In an embodiment as shown in FIG. 1, a mobile status update apparatus 104 includes a wireless digital communications receiver 114, a processor 118 coupled to the receiver, a memory 116 holding program instructions coupled to the processor, a display device 124, 132 such as an e-ink or thin or OLED LCD display device also coupled to the processor, and a wearable display substrate 120 (such as a shirt or other article of clothing) supporting the display device 124, 132. In an embodiment, the display device may comprise a flexible OLED or e-ink display substrate to better conform to the user's body. A system 100 supports operation of the apparatus 104 by collecting and pushing information for display via a hub 102 and other components.

In an embodiment, the processor 118, such as a cellular phone, cellular or wireless (Wi-Fi) data device, computer, or a control panel, may be integrated in an electronic device with the receiver 114. In another implementation, the device may be controlled by sending messages over a network, such as an SMS message sent from a specified cellular phone number using a separate client 106, such as a smart phone, notepad computer, notebook computer, desktop computer, or other computing and communications device. In another implementation, the device may be controlled by sending messages over a network where such messages come from over a password-protected connection. In another implementation, the device may be controlling by sending messages over a network where such messages contain a code that serves as an indication that the message is authorized or that identifies the sender of the message and allows the device to determine whether the sender is then authorized and what the authorization permits the sender to do. In another implementation, the message may come as a voice message (whether over a network or not) and a voice print identification may be made to determine the identity of the sender, whether the sender is then authorized and what the authorization permits the sender to do.

In an embodiment, the receiver 114 is capable of receiving data from the internet 110, whether directly or forwarded from another device. It is to be understood that a private network without internet access, such as a LAN or a Bluetooth connection may also be utilized. Initial implementation will likely include Wi-Fi (i.e., technologies including wireless local area network (WLAN) based on the IEEE 802.11 standards, device to device connectivity such as Wi-Fi Peer to Peer or Wi-Fi Direct, or a range of wireless technologies that support peer-to-peer area network, wireless LAN or wireless WAN connections), Bluetooth, SMS, infrared, GSM or COMA cellular communications protocols, potentially in a combination, and potentially transmitted through a portable device such as a cellular phone.

The processor 118 may operate a user interface (not shown) enabling a user to identify which updates they wish to display, which updates display for how long, which updates remain visible even if conflicting lower priority updates are received, and other rules for selecting and displaying messages. The rules for determining which updates remain visible, the priority of updates for display, and filtering of updates need not be the same rules that apply to the user's account, such as the user's Twitter™ account, when accessed on a different device. Indeed, the display limitations and specific use to which the device is being put will normally favor using a different rule set. Differential rule sets based on these factors may be stored locally (or in a proxy server) and, where necessary, implemented by local reformatting and/or filtering of the content prior to display. Alternatively, the rule sets may be stored on the server level and the content served from the server in conformance with the appropriate rule set. In a preferred embodiment, where the device seeking the data transmits information about itself, such as in an HTTP header field, such data may be used to identify the type of device and/or the appropriate rule set.

Messages received meeting the criteria are shown on the display device 124, 132 mounted on the display substrate 120, for example a t-shirt, hat, a pin, button, or other object. The display device may optionally incorporate one or more user input devices (not shown), which may receive control input by touch, light (intensity, direction, or wavelength), sound, radio signal, and/or other mechanisms. The display 124, 132 may be capable of displaying at least the 140 characters plus accompanying identifying information when used in conjunction with a Twitter feed. The display may also scroll, either automatically or upon actuation of processor input. The size of the text or other content on the display may be scaled so that it can be viewed by the intended audience, which scaling may be done in response to a manual input, an automated analysis of the size of the location, the distance or relative size of faces visible through the camera, a database of venues with venues identified by geolocation data such as GPS, the audio characteristics of ambient sound (such as by using echo timing to determine the likely size of the room), or other criteria.

Another implementation is to display the user's own status updates either exclusively or preferentially. Similarly, the user's own status updates or the most recent update may be displayed in one area of the display while the remaining portions of the user's "feed" would display in another. In this manner, the user's current status may always be visible on the display. In one implementation, the server for the social network is configured to forward each of the user's status updates to the user's clothing-mounted display or other display device. In another implementation, the server for the social network is given control, either exclusively or non-exclusively and either permanently or for a time period, over some or all of the functions of the device or some or all of the display area of the device. In another implementation, updates are made using an application or program that communicates with the social network and with the device, sending status updates to one or both as directed by the user or as indicated by a rule set. In another implementation, the social network (or a browser plug-in or similar auxiliary program) displays a button, or provides a keystroke or menu driven option, to actuate a "post to clothing-mounted device" or "post to display" option. In this manner, a user may "promote" or "elevate" a post to the display. A similar option may be provided to demote or remove a post from the display. These options may be made available to the owner or operator of the clothing-mounted display device or other display modality, or to others as designated by the owner or operator of the clothing-mounted display device or other display modality.

A sample implementation of this invention may involve Twitter™ or Facebook™ status. It should be understood that the same device would be operable with multiple subscription hub services, either simultaneously or sequentially. Using Twitter™ as an example of a subscription hub, the user obtains a clothing-mounted display device 120 (e.g., display shirt). The shirt 124 has a first display device 124 on the front 126 and a second display device 132 on the back 130. The first display device 124 may be coupled to the second display device 132 via a wired or wireless connection 128. Each display device 124, 132 may be mounted to the shirt 120 using a respective suitable pocket 122, 134 with a substantially transparent or open face and optionally a closure such as a zipper or the like to permit removal of the display device while securely holding it in place for use. The user plugs the shirt 120 into their computer to initially configure the shirt. The user may configure, for example, the shirt to display their current (e.g., Twitter™) status on the back display 132 and to have their message (e.g., Twitter™) feed display on the front display 124. If the user follows the @whitehouse Twitter™ account, for example, when @whitehouse updates their Twitter™ status, the processor causes the front of the shirt 124 to display the @whitehouse status update.

Optionally, the device may be configured to filter content, such as obscenities or designated sensitive words using the processor 118 and program memory 116. The device may also be configured to prioritize updates from users also using the device, from users within a set proximity, from users sending messages related to the activity or place the user is engaged in, or otherwise. To enable location-sensitive prioritization, the device may be equipped with a geolocation device, such as a GPS, triangulation, Wi-Fi proximity location, or IP address geolocation device. The device may also take advantage of location updates that are incorporated into Twitter™ and similar online subscription hub services. In a preferred implementation, the order or priority of the items in a feed are weighted by proximity of the sender of the data being assessed to the user. In another implementation, posts that are also relevant to persons near the user are given additional weighting.

Whether used alone or in conjunction with other filtering mechanisms, filtering technology based on words or meaning of sentences or phrases may be utilized. The filtering system may be configured so that it is automatically tuned or altered based on a database (public, user created, or a combination) of appropriate filters for certain venues or for use when proximate (or not proximate) to certain people or devices. The filters may also be correlated to time of day or the date. The system may be set to apply filters to all posts or to posts meeting certain criteria, such as posts coming from certain sources or not coming from certain sources, such as a "white list" or "black list". In one embodiment, a posting source may be banned either globally, during certain time periods, or at certain locations.

Posts that are subject to filtering may be automatically filtered, sent to a person for approval, sent to a secondary display of the user for approval, or displayed in small text, optionally upside down when on a shirt-mounted display, for approval by the user. Optionally, an audible, visible, or tactile notification of pending messages may be used. Instead of filtering, or in addition to filtering, posts may be limited to those who "follow" the user, "friend" the user, whom the user "follows", whom the user "friends", or based on subscriptions to the wearer's or post source's posts. In other words, the user may designate certain messages sources as qualified to post (or disqualified from posting) messages on a client display device, either using a local filter process parameter or a parameter assigned at the subscription hub.

Another embodiment identifies other users of specified devices, whether identical or identified as interoperable with the user's display device, that are within a wireless receiving range, or other defined proximity, of the user or user's display device. The identification may be made using GPS or other geolocation data and a network connection, a radio signal such as a blue tooth signal, or any other locally concentrated radio, light, or sound signal. Once identified, the interoperable devices may operate on a network with each other, whether communicating over the internet, communicating over blue tooth or other local signals, or communicating over a local area network. Interoperable devices on such a network may identify the user accounts associated with them, and such accounts may be given priority in determining which posts get displayed. Similarly, direct messaging between interoperable devices may be done, displaying the messages on the recipient's display and optionally identifying the sender. Relative distance between devices may be determined based on signal strength and/or GPS or other geolocation data, and the relative priority given to posts originating on such devices may be positively or negatively weighted based on distance to the display device.

Users may also configure their display devices to prioritize posts based on the user's status or desired type of communication. A user seeking to meet people might associate a "meet people" signal with their device. In a preferred implementation, the device may be configured to display an indication of the user's status or desires together with a method for displaying a message on the device. For example, the display of the user who wants to meet people might say "looking to meet people, display your message here by texting 555-1212".

As the sole criteria for selecting posts for display, or in combination with other criteria, a user may elect to display posts containing a specified "Hash Tag", which is a word or phrase that identifies the subject matter of the message, and is typically preceded with a "#" character, as in "#USPTO". In one implementation, a user may utilize non-displayed information, such as metadata, in the same manner as a hash tag. To maximize the space available for content, or for aesthetic or other reasons, the system may be configured to automatically remove hash tags (or other data, such as the name of the sender, geographic tags, or time and date stamps) prior to display. The hash tag itself may be tied to the specific user's display mechanism or to the venue where the display mechanism is located, and in such a case it is a preferred implementation to remove such hash tags prior to display. The removal of hash tags and other data may be programmatically tied to the amount of available space on the display or the number of posts the user wishes to display, so that tags are removed when their removal would permit additional content to be displayed. The display device may optionally be configured to automatically shorten certain phrases (such as by shortening "laughing out loud" to "LOL"). The display device may optionally be configured to automatically expanded certain phrases (such as by expanded the abbreviation "LOL" to "laughing out loud"). Such shortening or expansion may take place on the server level or on a proxy server as well, and may be tied to the user's preferences for the amount of content to be displayed and the amount of space available in which to display content.

In another variant, a user seeking to locate a specific person might post a photograph of that person to their own device. A person wishing to assist a user in locating a person may similarly post a photograph of a person to the user's device.

In an embodiment, the display device is capable of displaying both textual and graphic information. In such an implementation, status updates from social networking sites such as Facebook™ may include a photograph, and cause the photograph to be displayed on the mobile status update apparatus 104. Where photographs are present, the metadata from the photograph may be used in conjunction with the inventions, such as by extracting copyright or geolocation data. In the alternative, or in addition, the display may be capable of displaying text only.

Where metadata is present in photographs or other posts, such metadata may be utilized to determine the location the photograph was taken. Photographs taken proximate to the user or meeting other user criteria, such as being taken in a location where the user's best friend is then located, may be preferentially displayed. Facial recognition technology may be incorporated so that photographs of certain persons, such as those on the user's "friends" list, are preferentially displayed. Photographs already tagged as containing a specified user may also be preferentially displayed (or deprecated).

The characteristics of the venue where the user is located may be measured using microphones, cameras, antennas, or previously stored data. In an embodiment, the faces of people recently proximate to the user (for example, as captured by a camera mounted on the device or as retrieved from a database where the query is made for facial characteristics based on the other person's proximity) may be identified. Photographs containing such persons, or posts from such persons, may be preferentially displayed. Photographs with indicia of being taken at or near the venue (as might be determined, for example, by comparison with the measured or retrieved characteristics of the venue, or by matching elements in a photograph with elements the device imaged in the venue) may be preferentially displayed.

In another embodiment, the mobile status update apparatus 104 may be used as a local display for photographs taken by the user or those present with the user. Thus, for example, a user at a bachelorette party might have a series of interesting photographs displayed on a mobile status update apparatus worn by her throughout the night, each photograph taken by herself or those accompanying her. Those who are not physically present may, in a less preferred implementation, send photographs to the mobile status update apparatus as well. In one simple implementation, the photographs may be updated on the mobile status update apparatus by direct connection to the camera or other photographic device (such as a camera equipped phone).

The mobile status update apparatus may also be used to display data without integration into a social network. For example, the display device may bear its own SMS number (or connect to an SMS device). In such a case, a user may display the phone number and a message saying that messages sent to the number appear on the shirt. This message may be presented either through the display device 124, 132 itself or through fixed content on the shirt 120 or other display substrate. It should be noted that certain services use SMS messaging to forward posts (such as Twitter), and in such a case the account may be configured to send messages meeting identified criteria to the user's SMS number.

In another implementation, sales, membership, or web traffic generated through the mobile status update apparatus may be used to generate commissions to the person wearing the mobile status update apparatus and/or to another party. For example, the shirt might be given a shortened, encoded URL, bearing a message such as "Get your own twitter shirt at bit.ly/d9XEFC". Such sales may be used to offset the cost of the mobile status update apparatus or other portions of the invention. The referral URL may be changed dynamically, so that the person or entity interested in tracking "click-throughs" may track the traffic generated at each event or within each time period. In an embodiment, the URL changes to include the location and time either constantly, at set intervals, with a set amount of movement, or upon demand. In another implementation, the encoded URL may be presented as a bar code, a QR code, a 3-D bar code, an OCR-capable URL, or a return text. For example, if a user transmits a message or text to the device, the device may reply with a return text including a URL or other information, optionally limited to cases where the text contains specific trigger words. The referral URL may also be configured to indicate how the referral fee is to be paid, for example by including the geographic location in the URL so that the owner of the venue may get a share. It may also be possible to track where the devices are in use, and even where specific ones of the devices are located, by reading the geographic data embedded in such codes. In another embodiment, code readers at specified location may gather such data without requiring a potential purchaser or other third party to attempt to access the URL identified in the code.

It should be noted that referral information embedded in a code on clothing need not be limited to clothing with a display capability. For example, if a gym gives each member a unique referral code embedded into a QR code and printed on a shirt, the gym might give users a credit for every prospective member or actual member who inquired with the gym by accessing through a URL with that embedded referral code.

In another variant, the code displayed on the user's clothing may contain embedded data to identify the referral source, and, when scanned by a portable device, generate a coupon on the portable device that provides a discount or other incentive to the person scanning the code such that they will show the coupon or other incentive to the business being advertised for when they seek to purchase the advertised goods or services. The coupon or other incentive generated on the phone used to scan the code will, in turn, contain embedded data identifying the referral source as the person who was wearing the code when it was scanned. When the coupon or other incentive is presented to the business, the business will in turn scan, enter, or otherwise read the referral information in that document, code or image and be able to credit the referral source.

In another implementation, posting material to a shirt or other mobile status update apparatus may be done on a paid basis, using either real or virtual currency, value-linked point systems such as Facebook™ Credits, a micropayment system, or other exchangeable items. Thus, for example, an attractive woman at a club might wear a shirt that charges one dollar for each message displayed. Optionally, prices might influence the length of time displayed, the prominence of the display, or other characteristics. In such a case, the woman might find that enough people at the club send her text messages for display on her shirt to allow significant income to be earned. Some or all of the income to a wearer may be split with service providers, persons renting out the device to wearers, the club owners (potentially as determined by geolocation data), or others. Wearers may optionally be given the ability to opt into, or opt out of, such a system, and when they are participating in such a system, their display may be configured to indicate the cost and/or mechanism to be used to send a message to their display. Such information may alternatively be provided in printed form, as a pin the user wears, or as a message printed onto the user's clothing.

Posting access to the system may be limited to those who elect to "follow", "friend", or otherwise subscribe to the wearer, or who similarly subscribe or provide information to service providers, for example clients 106 and 108, optionally connecting via a wireless network 112. One example might be requiring any person who wants to send a message to a shirt to "like" the shirt manufacturer's social networking home page, or to "follow" the shirt manufacturer's Twitter™ or similar messaging hub account via a messaging hub 102. In this manner, a user seeking a large number of "followers" may accomplish that by wearing a mobile status update apparatus. The messaging hub 102 may push messages or other content to the receiver 114 via the Internet 110 and/or other communications network. The mobile status update display apparatus 104 may display content in response to messages or other content pushed from the hub 102. In one embodiment, advertisements, whether traditional or in the form of "sponsored posts", may be displayed.

While it is preferable for the mobile status update apparatus 104 to be worn by the account owner, one implementation is to have one or more mobile status update apparatus worn by one or more persons who do not own the account. In such a case, for example, a politician seeking to obtain lots of "followers" might hire college students to wear the mobile status update apparatus as a method of advertising. In such a case, payment may be made by tracking, as described above.

The cellular phone carrier, service provided, backend provided, or a peer to peer system may be used to automatically communicate to the processor or to a device the user has as to which other people who use the system (for example, either by having once used it, owning a mobile status update apparatus, having a mobile status update apparatus present with them, or having signed up for the system) are present within a set proximity of the user, the user's processor, the user's mobile status update apparatus, or at a location specified by the user.

In one implementation, a user might use extent "grouping" functions provided by social networks such as operated by a messaging hub 102 to identify a "group" permitted to post to the user's mobile status update apparatus.

In the event that something is posted that the user finds inappropriate or embarrassing, or for any other reason, an embodiment includes an easily accessible processor that may be actuated to turn off the mobile status update apparatus, to wipe out the currently displayed message, and/or to ban the user (either temporarily or permanently) from posting to the mobile status update apparatus.

Thus, where a user receives a message the user does not want, the user has an easy way to delete such a message. With a touch screen, the user might swipe across the message. There may be one or more buttons on the device corresponding to either the most recent message still displayed (in the case of a single button) or other messages (where more than one button is provided). The user may also have the option to actuate a single switch to remove all posts or content from their display. Similarly, such a switch might have the effect of altering the rule set in use by the display. For example, if the user left the "nightclub" rule set switched on while at work, she may quickly restore a default setting by activating the switch. Such an alteration in rule set would preferably be applied to the extent messages on the display, resulting in the removal of messages not meeting the criteria for display under the new rule set.

In another preferred implementation, the mobile status update apparatus may show a formatted version of the web or portable device display that the social network hub 102 normally generates for display on other clients, such as computer client 106 or a smart phone client 108. In an embodiment, this display is a designated "public" view of the profile, or the "friends" view of the profile, where such views are defined so as to exclude information that the user deems to be private. A less preferable option may be to display the private view of the profile. In another embodiment, the user's display may be duplicated on another device, such as the user's friend's computer, the user's cellular phone, or the user's heads-up display glasses. A small monitor duplicating the display may also be used and mounted in a place the user can easily and regularly monitor.

In an embodiment, one or both display portions 124, 132 of the mobile status update apparatus are equipped with user input functionality via touch sensitivity, light sensitivity, audio processing (in combination with a microphone), or video processing (in combination with a camera), all of which permit the user and/or others to directly interact with the mobile status update apparatus via the processor. While a separate input device, such as a mouse, a keyboard, a set of keys, a set of buttons, or a networked device might be acceptable to control the mobile status update apparatus, for example via a removable connector, it may be preferable to allow control of the mobile status update apparatus by direct interaction with the display device 124 and/or display device 132. In one simple implementation, the display device 124 is touch sensitive. In another implementation, the display device responds to spoken commands. In another, a user with a laser, preferably tuned to a specified frequency and/or intensity and/or pulse pattern, is able to interact with the display device 124 by shining the laser on the display device or an adjacent light sensor. Multiple lasers or a single laser where the frequency, intensity, and/or pulse pattern may be user modulated, may be used to perform different functions. For display device mounted on a substrate covering sensitive body parts, it may be desirable to visibly indicate where the touch or interaction-sensitive portions of the display device exist, to limit the sensitive portions of the display device to those areas where the user finds interaction to be acceptable, and/or to blank the display or provide some other warning or response when a user attempts to touch or otherwise interact with a portion of the display overlying a body part the user prefers not be touched.

The touch features of the display may require that the specific user be the one touching the display. A specified very low current may be sent from the display (or another source) to the user, and the display would not respond to a touch from a finger that did not carry that current.

In an embodiment, the mobile status update apparatus may be locked unless the user takes some action, such as actuating a button. The mobile status update apparatus may optionally re-lock when the actuation ceases, or after a set period of time. This may also take the form of requiring the user to approve every post to the display before it is shown, or requiring the user to approve every post meeting set criteria before it is shown.

In view of exemplary system shown and described herein, a methodology that may be implemented in accordance with the disclosed subject matter, will be better appreciated with reference to a flow chart. For purposes of simplicity of explanation, the methodology is shown and described as a series of acts in blocks, but the claimed subject matter is not limited by the number or order of blocks, as some blocks may occur in different orders and/or at substantially the same time with other blocks from what is depicted and described herein. Moreover, not all illustrated blocks may be required to implement a methodology as described herein. It is to be appreciated that functionality associated with blocks may be implemented by software, hardware, a combination thereof or any other suitable means (e.g., device, system, process, or component). Additionally, it should be further appreciated that the methodology or other methodologies disclosed throughout this specification are capable of being stored as encoded instructions and/or data on non-transitory computer-readable medium to facilitate transporting and transferring such methodologies to various devices.

FIG. 2 is a flow diagram showing an example of a method 200 consistent with the present technology. A wireless receiver may be used for receiving messages 202 pushed from a subscription hub. The messages may comprise subscribed messages for a user identified with a user account, being messages posted by other users of the hub to which the user has subscribed. The messages are pushed by the hub in response to postings from the other users.

A processor coupled to the receiver may be used for automatically processing 204 the messages to determine content for display on a display device. For example, processing may include filtering and discriminating between message types as discussed above. In an embodiment, the messages further comprise user status messages which are messages posted to the hub by the user, and wherein the messages are pushed by the hub to the receiver further in response to postings from the user, and the display device comprises two separate screens mounted at separate locations of the user's body. In such case, the processor may process the subscribed messages for display exclusively on a first one of the two separate screens, and the user status messages for display exclusively on a second one of the two separate screens. As described herein, a single display may also be used.

Method 200 may further comprise displaying 206 the content on the display device in response to the processor, wherein the display device is mounted to the user's body using an article of clothing or the like, so that the content is displayed to persons in the vicinity of the user at least partly in response to posting of the messages to the hub.

In another embodiment, the display may be created by projecting an image onto a surface. In one embodiment, the projector would be mounted on a hat, glasses, a protruding belt buckle, or, where certain body parts stick out in front of others (such as how a female chest, or a heavily muscled male chest, may protrude past the stomach), mounted on clothing over such body part. In another embodiment, the projection target is a floor in front of the user, a table in front of the user, or the ceiling.

While many of the implementations described herein may include use of a wearable display device, it should be understood that the implementations may be executed using a device not affixed to clothing. Where the implementation requires that the device be visible to third parties, it is possible to hold up the device as if it were attached to clothing. Certain other implementations described herein may be accomplished without holding it up for display to third parties, such as by allowing third parties to view the device or, where appropriate, using the device as a private display modality to be viewed by the user.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

With reference to FIG. 3, there is provided an exemplary apparatus 300 that may be configured as a client-side message processing and display device, or as a processor or similar device for use within the client device, for mobile status update display. The apparatus 300 may include functional blocks that can represent functions implemented by a processor, software, or combination thereof (e.g., firmware).

In one embodiment, the apparatus 300 may include an electrical component or module 312 for receiving messages pushed from a subscription hub comprising subscribed messages for a user identified with a user account, the subscribed messages being messages posted by other users of the hub to which the user has subscribed, wherein the messages are pushed by the hub in response to postings from the other users. For example, the electrical component 312 may include at least one control processor coupled to network interface or the like and one or more memory components with instructions for connecting to a subscription hub via a wireless interface, and receiving the subscription messages for a designated user account. The control processor may operate an algorithm. The algorithm may operate in an application to perform detailed operations for obtaining messages from the subscription hub via the wireless interface, for example, by establishing a connection or session according to a communications protocol, receiving message data during the wireless session, and terminating or suspending the session once available messages are received.

The apparatus 300 may include an electrical component 314 for automatically process the messages to determine content for display on the display device according to a user-determined filter parameter. For example, the electrical component 314 may include at least one control processor coupled to a memory holding instructions for parsing incoming messages, determining a semantic content of each message, determining a parameter of a message sender, or other information, and deciding based on the determined information whether or not to display each message or which portion of each message to display. The electrical component 314 may include the at least one control processor operating an algorithm. The algorithm may operate in a processor of a client device to process received message data and select information from the messages for display based on parameters determined from message data. The parameters may include, for example, message topic, geographical relevance of the content to a current location of the display device, location, residence or authorization status of each source contributing a subscribed message, a fee amount paid by a message source, a message serial number or sequence (which may be selected randomly), or other parameter. The algorithm may include conditional logic, fuzzy logic, and/or heuristic logic to select content for display based on message-related parameter information.

The apparatus 300 may include an electrical component 316 for displaying the content on the display device in response to the processor. For example, the electrical component 316 may include at least one control processor coupled to a memory holding instructions for providing text or graphics data from the messages to a display processor for providing an electronic signal driving a display device. The electrical component 316 may be, or may include, at least one control processor operating an algorithm. The algorithm may operate in a processor of the client to generate display data based on input, including but not limited to formatting the content for display according to a predefined style or theme. In a more detailed aspect, the algorithm may include separating content for display on separate display screens based on message-related parameter information, including, for example, the message source or source type (e.g., user generated or subscribed).

The apparatus 300 may include similar electrical components for performing any or all of the additional operations described in connection with FIG. 2, which for illustrative simplicity are not shown in FIG. 3.

In related aspects, the apparatus 300 may optionally include a processor component 302 having at least one processor, in the case of the apparatus 300 configured as a client device having a wireless interface to a message hub. The processor 302 may be in operative communication with the components 312-316 or similar components via a bus 310 or similar communication coupling. The processor 302 may affect initiation and scheduling of the processes or functions performed by electrical components 312-316. The processor 302 may encompass the components 312-316, in whole or in part. In the alternative, the processor 302 may be separate from the components 312-316, which may include one or more separate processors.

In further related aspects, the apparatus 300 may include a wireless interface component 308, for communicating with the subscription hub over a network. The apparatus 300 may include an input/output port 308 for receiving user input for control of the content selection or display process, or other operation of the processor 302. The apparatus 300 may include a component for storing information, such as, for example, a memory device/component 304. The computer readable medium or the memory component 304 may be operatively coupled to the other components of the apparatus 300 via the bus 310 or the like. The memory component 304 may be adapted to store computer readable instructions and data for performing the activity of the components 312-316, and subcomponents thereof, or the processor 302, or the additional aspects of the methods disclosed herein. The memory component 304 may retain instructions for executing functions associated with the components 312-316. While shown as being external to the memory 304, it is to be understood that the components 312-316 can exist within the memory 304.

Various aspects are presented herein in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or keypad type interfaces. Examples of such devices include, smart phones, notepad computers, personal digital assistants (PDAs), and other electronic wireless devices. Although the illustrated examples focus on displays mounted on a person, it should be appreciated that the inventive concepts may also be practiced using other types of public display devices to display the selected content, for example, electronic bill boards or display screens mounted in public spaces. In such cases, involving fixed displays or displays with limited mobility, a wired interface may be used instead of or in addition to the wireless interfaces described herein.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. A non-transitory computer readable medium may include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable storage medium known in the art. A non-transitory computer-readable storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The foregoing embodiments merely exemplify various apparatus and systems for mobile status update display. The present technology is not limited by these examples.

What is claimed is:

1. An apparatus comprising:
an article of clothing having an integral display device mounted thereon, the integral display device operably coupled to a wireless receiver and comprising a flexible display screen configured to display content to persons in a vicinity of a user wearing the article of clothing;
a processor coupled to the wireless receiver; and
a memory coupled to the processor, wherein the memory holds program instructions that, when processed by the processor, causes the integral display device to:
receive multicast messages posted by a plurality of people to a hub, wherein the messages are transmitted by the hub to the wireless receiver coupled to the display device; and
display one or more messages on the display screen, wherein the one or more messages displayed are associated with a Hash Tag specified by the user of the integral display device and are filtered by whether the user has designated an account originating the message as qualified or disqualified to post.

2. The apparatus of claim 1, wherein the article of clothing is configured by a computing device operably connected to the article of clothing.

3. The apparatus of claim 1, wherein the messages are filtered by whether the messages contain obscenities or designated sensitive words prior to display on the display device.

4. The apparatus of claim 1, wherein the messages utilized for display are prioritized based at least in part on the proximity of the person sending each message.

5. The apparatus of claim 1, wherein the messages utilized for display are filtered by whether the user has designated the account originating the message as qualified or disqualified to post.

6. The apparatus of claim 1, wherein the Hash Tag is a word or phrase preceded with a "#" character.

7. The apparatus of claim 1, wherein the Hash Tag is non-displayed information.

8. The apparatus of claim 1, wherein the messages displayed are shortened and/or expanded based at least in part on the user's preferences for the amount of content to be displayed.

9. The apparatus of claim 1, wherein the messages displayed are shortened and/or expanded based at least in part on the amount of space available on the display device to display content.

10. An apparatus comprising:
a server, in communication with at least one article of clothing having an integral display device mounted thereon, and a wireless receiver, the integral display device comprising a flexible screen configured to display content to persons in a vicinity of a user wearing the article of clothing, and the server comprising a processor and a memory, the memory holding program instructions that, when processed by the processor, cause the server to:
receive multicast messages from a plurality of people posted to a hub;
identify one or more messages posted to the hub and associated with at least one Hash Tag specified by the user of the integral display device;
filter the messages by whether the user has designated an account originating the message as qualified or disqualified to post; and
transmit the one or more messages in order of priority to the integral display device.

11. The apparatus of claim 10, wherein the program instructions, further cause the server to prioritize the message(s) according to a rule set.

12. The apparatus of claim 10, wherein the article of clothing is configured by a computing device operably connected to the article of clothing.

13. The apparatus of claim 10, wherein the program instructions, further cause the server to filter messages containing obscenities or designated sensitive words prior to transmission to the display device.

14. The apparatus of claim 10, wherein the program instructions, further cause the server to prioritize the message(s) based at least in part on the proximity to the display device of the person sending each message.

15. The apparatus of claim 10, wherein the program instructions, further cause the server to filter the messages by whether a user has designated the account originating the message as qualified or disqualified to post.

16. The apparatus of claim 10, wherein the at least one Hash Tag is a word or phrase preceded with a "#" character.

17. The apparatus of claim 10, wherein the at least one Hash Tag is non-displayed information.

18. The apparatus of claim 10, wherein the program instructions, further cause the server to shorten and/or expand the displayed messages based at least in part on the user's preferences for the amount of content to be displayed.

19. The apparatus of claim 10, wherein the program instructions, further cause the server to shorten and/or expand the displayed messages based at least in part on the amount of space available on the display device to display content.

20. A method comprising:
receiving, by a server having a processor and a memory, multicast messages from a plurality of people posted to a hub;
identifying, by the server, one or more messages posted to the hub and associated with at least one-Hash Tag specified by a user of a display device mounted to an article of clothing, the messages filtered by whether the user has designated an account originating the message as qualified or disqualified to post, the display device comprising a flexible screen configured to display the one or more messages to persons in a vicinity of the user wearing the item of clothing; and transmitting, by the server, the one or more messages from the hub to a wireless receiver operably coupled to the display device.

\* \* \* \* \*